(12) United States Patent
Sun et al.

(10) Patent No.: US 12,425,164 B2
(45) Date of Patent: Sep. 23, 2025

(54) METHOD FOR TRANSMITTING REFERENCE SIGNAL AND DEVICE

(71) Applicant: VIVO MOBILE COMMUNICATION CO., LTD., Dongguan (CN)

(72) Inventors: Peng Sun, Dongguan (CN); Xueming Pan, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 748 days.

(21) Appl. No.: 17/697,853

(22) Filed: Mar. 17, 2022

(65) Prior Publication Data
US 2022/0209921 A1 Jun. 30, 2022

Related U.S. Application Data

(63) Continuation of application No. PCT/CN2020/116747, filed on Sep. 22, 2020.

(30) Foreign Application Priority Data

Sep. 25, 2019 (CN) .......................... 201910914130.9

(51) Int. Cl.
 *H04L 5/00* (2006.01)
 *H04W 36/00* (2009.01)
(52) U.S. Cl.
 CPC ....... *H04L 5/0053* (2013.01); *H04W 36/0077* (2013.01)

(58) Field of Classification Search
 CPC ..... H04W 72/23; H04W 24/04; H04W 72/12; H04W 72/0446; H04W 72/1263;
 (Continued)

(56) References Cited

U.S. PATENT DOCUMENTS

2011/0268087 A1 11/2011 Kwon et al.
2014/0233489 A1 8/2014 Kwon et al.
(Continued)

FOREIGN PATENT DOCUMENTS

CN 107534538 A 1/2018
CN 110149178 A 8/2019
(Continued)

OTHER PUBLICATIONS

International Search Report issued in corresponding International Application No. PCT/CN2020/116747, mailed Dec. 9, 2020, 4 pages.
(Continued)

*Primary Examiner* — Hassan A Phillips
*Assistant Examiner* — Prenell P Jones
(74) *Attorney, Agent, or Firm* — IPX PLLC (57) ABSTRACT

Embodiments of this application provide a method for transmitting a reference signal and a device. The method includes: receiving target information from a network device, where the target information is used to indicate a target signal, and the target signal is N RSs or RSs in N RS sets and is used to activate a SCell of UE; and receiving the target signal from the network device according to the target information, where the target information is carried on first MAC CE signaling or first DCI, and N is a positive integer.

19 Claims, 3 Drawing Sheets

(58) Field of Classification Search
CPC ........... H04W 36/0077; H04W 52/367; H04W 52/242; H04W 52/243; H04W 52/245; H04L 5/00; H04L 5/0053

See application file for complete search history.

(56) References Cited

U.S. PATENT DOCUMENTS

| | | | |
|---|---|---|---|
| 2015/0236825 A1* | 8/2015 | Park | H04L 1/20 370/329 |
| 2015/0264592 A1* | 9/2015 | Novlan | H04L 27/2601 370/252 |
| 2015/0304925 A1* | 10/2015 | Hwang | H04J 11/005 370/329 |
| 2017/0005764 A1* | 1/2017 | Park | H04W 8/005 |
| 2017/0289899 A1* | 10/2017 | You | H04L 5/0007 |
| 2018/0103482 A1 | 4/2018 | Wu et al. | |
| 2018/0302848 A1* | 10/2018 | Liu | H04L 5/00 |
| 2019/0045491 A1 | 2/2019 | Zhang et al. | |
| 2019/0090227 A1 | 3/2019 | Tsai et al. | |
| 2019/0141734 A1 | 5/2019 | Lei et al. | |
| 2019/0215117 A1 | 7/2019 | Lee et al. | |
| 2019/0215136 A1 | 7/2019 | Zhou et al. | |
| 2020/0305094 A1* | 9/2020 | Ouchi | H04W 52/325 |
| 2021/0168858 A1* | 6/2021 | Liu | H04W 74/0833 |
| 2021/0199790 A1* | 7/2021 | Taylor | A01C 7/105 |
| 2022/0022274 A1* | 1/2022 | Zhang | H04W 76/15 |
| 2022/0060302 A1* | 2/2022 | Zhang | H04W 76/19 |
| 2022/0070853 A1* | 3/2022 | Guo | H04B 7/0695 |
| 2022/0151009 A1* | 5/2022 | Zhang | H04L 1/188 |
| 2022/0159767 A1* | 5/2022 | Zhang | H04L 5/0023 |
| 2022/0174720 A1* | 6/2022 | Yang | H04W 72/23 |
| 2022/0201696 A1* | 6/2022 | Go | H04W 72/51 |
| 2024/0276389 A1* | 8/2024 | Yuan | H04L 5/0091 |
| 2024/0372751 A1* | 11/2024 | Tian | H04L 25/02 |

FOREIGN PATENT DOCUMENTS

| | | |
|---|---|---|
| CN | 110166192 A | 8/2019 |
| CN | 110167163 A | 8/2019 |
| IN | 109391986 A | 2/2019 |
| WO | 2019154268 A1 | 8/2019 |

OTHER PUBLICATIONS

First Office Action issued in related Chinese Application No. 201910914130.9, mailed Dec. 29, 2021, 18 pages.

Qualcomm Incorporated, Charter Communication "Discussion on fast SCell activation based on Aperiodic TRS (A-TRS)", 3GPP TSG RAN WG2 Meeting #106, R2-1906461, May 2019.

ZTE Corporation, "On delay reduction of SCell Activation", 3GPP TSG-RAN WG2 Meeting #106, R2-1907097, May 2019.

Extended European search report issued in related European Application No. 20870370.2, mailed Oct. 5, 2022, 10 pages.

First Examination Report issued in related Indian Application No. 202217023956, mailed Aug. 29, 2022, 6 pages.

Office Action issued in related Korean Application No. 10-2022-7013327, mailed Oct. 30, 2024, 8 pages.

Qualcomm Incorporated, "Discussion on fast SCell activation based on Aperiodic TRS (A-TRS)", 3GPP TSG RAN WG2 #105bis, R2-1904929, Mar. 2019, 5 pages.

3GPP, TS38.214 v15.6.0, NR; Physical layer procedures for data, 3GPP, Jun. 2019, 105 pages.

* cited by examiner

METHOD FOR TRANSMITTING REFERENCE SIGNAL AND DEVICE

CROSS-REFERENCE TO RELATED APPLICATIONS

This application is a continuation of International Application No. PCT/CN2020/116747, filed Sep. 22, 2020, which claims priority to Chinese Patent Application No. 201910914130.9, filed Sep. 25, 2019. The entire contents of each of the above-referenced applications are expressly incorporated herein by reference.

TECHNICAL FIELD

Embodiments of this application relate to the field of communications technologies, and in particular to a method for transmitting a reference signal and a device.

BACKGROUND

In the scenarios such as carrier aggregation (CA), dual connectivity (DC), or multi-transmission reception point (multi-TRP), UE activates a secondary cell (SCell) of the UE mainly by using a command of media access control control element (MAC CE). After receiving the command of the MAC CE, the UE needs to perform time-frequency tracking on a downlink channel of the SCell according to a tracking reference signal (TRS) sent by a network device, so as to implement time-frequency synchronization.

In the prior art, the network device will periodically send the TRS to the UE. In this way, after the command of the MAC CE is demodulated, the UE may have to wait until the next TRS period to implement the time-frequency synchronization with the SCell, resulting in excessively long activation time or excessively much signaling overhead.

SUMMARY

Embodiments of this application provide a method for transmitting a reference signal and a device, to resolve a problem of excessively long activation time or excessively much signaling overhead because the network device periodically sends a TRS to UE during activation of a SCell.

According to a first aspect, an embodiment of this application provides a method for transmitting a reference signal applied to UE. The method includes: receiving target information from a network device, where the target information is used to indicate a target signal, and the target signal is N reference signals (RS) or RSs in N RS sets and is used to activate a SCell of the UE; and receiving the target signal from the network device according to the target information, where the target information is carried on first MAC CE signaling or first downlink control information (DCI), and N is a positive integer.

According to a second aspect, an embodiment of this application provides a method for transmitting a reference signal applied to a network device. The method includes: sending target information to user equipment UE, where the target information is used to indicate a target signal, and the target signal is N RSs or RSs in N RS sets and is used to activate a SCell of the UE; and sending the target signal to the UE according to the target information, where the target information is carried on first MAC CE signaling or first DCI, and N is a positive integer.

According to a third aspect, an embodiment of this application provides UE, where the UE includes a receiving module, where the receiving module is configured to receive target information from a network device, where the target information is used to indicate a target signal, and the target signal is N RSs or RSs in N RS sets and is used to activate a SCell of the UE; and the receiving module is further configured to receive the target signal from the network device according to the target information, where the target information is carried on first MAC CE signaling or first DCI, and N is a positive integer.

According to a fourth aspect, an embodiment of this application provides a network device, where the network device includes a sending module, where the sending module is configured to send target information to user equipment UE, where the target information is used to indicate a target signal, and the target signal is N RSs or RSs in N RS sets and is used to activate a SCell of the UE; and the sending module is further configured to send the target signal to the UE according to the target information, where the target information is carried on first MAC CE signaling or first DCI, and N is a positive integer.

According to a fifth aspect, an embodiment of this application provides UE, including a processor, a memory, and a computer program that is stored in the memory and that can be run on the processor, where when the computer program is executed by the processor, the steps of the method for transmitting a reference signal according to the first aspect are implemented.

According to a sixth aspect, an embodiment of this application provides a network device, including a processor, a memory, and a computer program that is stored in the memory and that can be run on the processor, where when the computer program is executed by the processor, the steps of the method for transmitting a reference signal according to the second aspect are implemented.

According to a seventh aspect, an embodiment of this application provides a communications system, where the communications system includes the UE according to the third aspect and the network device according to the fourth aspect; or the communications system includes the UE according to the fifth aspect and the network device according to the sixth aspect.

According to an eighth aspect, an embodiment of this application provides a computer-readable storage medium, where the computer-readable storage medium stores a computer program, and when the computer program is executed by a processor, steps of the foregoing method for transmitting a reference signal are implemented.

In the embodiments of this application, the UE receives target information from the network device, and receives the target signal from the network device according to the target information, where the target information is used to indicate the target signal, and the target signal is N RSs or RSs in N RS sets and is used to activate the SCell of the UE; and the target information is carried on the first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE as needed in the prior art, so that this solution can shorten activation time in the case of a long period for sending the RSs; and reduce signaling overhead in the case of a short period for sending the RSs.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous to other embodiments or design schemes. To be precise, the use of the term such as "exemplary" or "for example" is intended to present a related concept in a specific manner.

In the description of the embodiments of this application, unless otherwise stated, "a plurality of" means two or more. For example, a plurality of processing units means two or more processing units; a plurality of elements means two or more elements, and the like.

Embodiments of this application provide a method for transmitting a reference signal: UE receives target information from a network device, and receives a target signal from the network device according to the target information, where the target information is used to indicate a target signal, and the target signal is N RSs or RSs in N RS sets and is used to activate a SCell of the UE; and the target information is carried on first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that this solution can shorten activation time in the case of a long period for sending the RSs; and reduce signaling overhead in the case of a short period for sending the RSs.

The technical solutions according to this application may be applied to various communications systems, for example, a 5G communications system, a future evolved system, or a plurality of communications fusion systems. There may be multiple application scenarios, for example, machine-to-machine (M2M), D2M, macro-micro communication, enhanced mobile broadband (eMBB), ultra-reliable & low latency communication (uRLLC), and massive machine type communication (mMTC). These scenarios include but are not limited to: scenarios such as communication between UE and UE, communication between network devices, or communication between a network device and UE. Embodiments of this application may be applied to communication between a network device and UE, communication between UE and UE, or communication between network devices in the 5G communications system.

Figure 1:
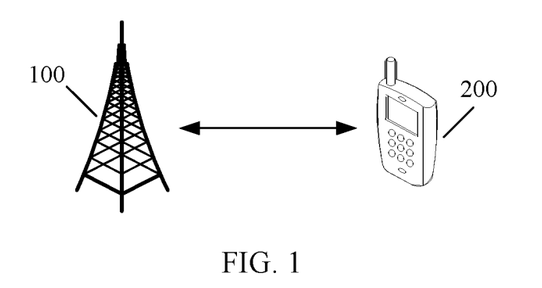
FIG. 1 is a schematic architectural diagram of a communications system according to an embodiment of this application.

FIG. 1 is a possible schematic structural diagram of a communications system according to an embodiment of this application. As shown in FIG. 1, the communications system includes at least one network device 100 (for example, only one network device is shown in FIG. 1) and one or more UE 200 (for example, only one UE is described in FIG. 1) connected to each network device 100.

The at least one network device 100 can serve at least one cell group (such as a master cell group (MCG) or a secondary cell group (SCG)). One MCG includes at least one primary cell (PCell) and may further possibly include at least one SCell; and one SCG includes at least one primary secondary cell (PSCell) and may possibly include at least one SCell.

Exemplarily, the communications system shown in FIG. 1 may be a multi-carrier communications system in such scenarios as a carrier aggregation scenario, a dual connection scenario, a multi-transmitting and receiving node scenario, and the like, which is not limited in this embodiment of this application.

The network device 100 may be a base station, a core network device, a transmission and reception point (TRP), a relay station, an access point, or the like. The network device 100 may be a base transceiver station (BTS) in a global system for mobile communication (GSM) or a code division multiple access (CDMA) network, a NodeB (NB) in wideband code division multiple access (WCDMA) system, or an eNB or an evolutional NodeB (eNodeB) in an LTE system. The network device 100 may further be a wireless controller in a cloud radio access network (CRAN) scenario. The network device 100 may further be a network device in the 5G communications system or a network device in a future evolved network. However, the use of words does not constitute a limitation on this application.

The UE 200 may be wireless UE or wired UE. The wireless UE may be a device that provides voice and/or other service data connectivity for a user, a handheld device with a wireless communication function, a computing device, another processing device connected to a wireless modem, an in-vehicle device, a wearable device, UE in a future 5G network, UE in a future evolved PLMN network, or the like. The wireless UE may communicate with one or more core networks by using a radio access network (RAN). The wireless UE may be a mobile device, such as a mobile phone (or referred to as a "cellular" phone) and a computer with a mobile device. For example, the wireless UE may be a portable, pocket-sized, handheld, computer built-in, or in-vehicle mobile apparatus that exchange voice and/or data with a radio access network, and a device such as a personal communication service (PCS) phone, a cordless phone, a session initiation protocol (SIP) phone, a wireless local loop (WLL) station, or a personal digital assistant (PDA). The wireless UE may further be a mobile device, a terminal, an access terminal, a wireless communications device, a terminal unit, a terminal station, a mobile station, a mobile console, a remote station, a distant station, a remote terminal, a subscriber unit, a subscriber station, a user agent, a terminal apparatus, or the like. As an example, in this embodiment of this application, a mobile phone is shown as an example of the UE 200 in FIG. 1.

During the activation of the SCell, the network device periodically sends a TRS to the UE. If a period for sending a TRS is long, activation time will be excessively long, and if the period for sending a TRS is short, the signaling overhead will be excessively large. To resolve the foregoing problem, this embodiment of this application provides a method for transmitting a reference signal.

Next, taking the interaction between the UE and the network device as an example, the method for transmitting a reference signal and a device provided in this embodiment of this application will be described in detail through a specific embodiment and an application scenario.

Figure 2:
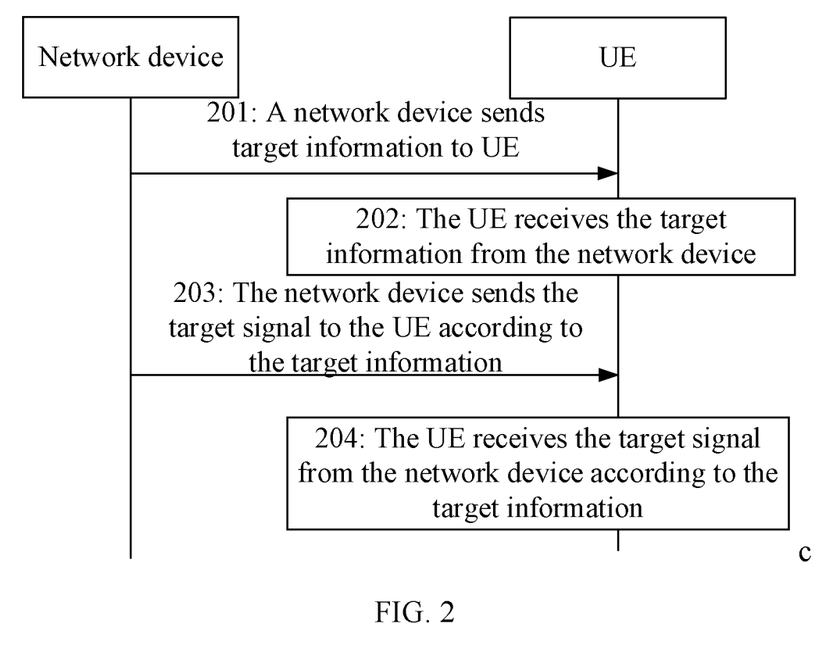
FIG. 2 is a schematic flowchart of a method for transmitting a reference signal according to an embodiment of this application.

Based on the communications system shown in FIG. 1, this embodiment of this application provides the method for transmitting a reference signal. As shown in FIG. 2, the method for transmitting a reference signal may include the following step 201 to step 204.

Step 201: A network device sends target information to UE.

The target information is carried on first MAC CE signaling or first DCI, or the target information may further be carried on another piece of signaling or information, which is not limited in this embodiment of this application.

In some embodiments, in case that the target information is carried on the first MAC CE signaling, the first MAC CE signaling is used to activate the SCell (that is, the first MAC CE signaling may be MAC CE signaling used to activate the SCell).

In some embodiments, in case that the target information is carried on the first MAC CE signaling, the first MAC CE may further be another piece of MAC CE signaling other than the MAC CE signaling used to activate the SCell, which is not limited in this embodiment of this application.

In some embodiments, in case that the target information is carried on the first DCI, the first DCI is used to schedule a physical downlink shared channel (PDSCH) carrying second MAC CE signaling, and the second MAC CE signaling is used to activate the SCell (that is, the first DCI is DCI used to schedule a PDSCH that carries MAC CE signaling used to activate the SCell).

In some embodiments, in case that the target information is carried on the first DCI, the first DCI may further be another piece of DCI other than the DCI used to schedule a PDSCH that carries MAC CE signaling used to activate the SCell, which is not limited in this embodiment of this application.

In some embodiments, in case that the target information is carried on the first DCI, the first DCI is allowed to indicate target uplink authorization (that is, the first DCI may or may not be used to indicate the target uplink authorization, which is not limited in this embodiment of this application). In addition, in case that the first DCI is further used to indicate the target uplink authorization, the target uplink authorization indicates that before receiving the target signal from the network device, the UE sends a physical uplink shared channel (PUSCH) to the network device. That is, when the first DCI triggers the target signal, the target signal is allowed to be sent after the PUSCH is triggered simultaneously.

In this embodiment of this application, when the UE receives the first DCI indicating the target uplink authorization, the UE may send the PUSCH to the network device before receiving the target signal from the network device, or the UE may not send the PUSCH to the network device before receiving the target signal from the network device, which is not limited in this embodiment of this application. Further, in some embodiments, the PUSCH is configured to indicate that the UE successfully receives the DCI, that is, the PUSCH is configured to indicate that the UE successfully receives the target information. The PUSCH may further be configured to indicate another piece of information, which is not limited in this embodiment of this application.

Exemplarily, in case that the target information is carried on the first DCI, if the first DCI triggers a single RS, the target uplink authorization indicates that the UE is allowed to send the PUSCH to the network device before receiving the target signal from the network device. For example, when the DCI triggers a single TRS, the TRS is allowed to be sent after the PUSCH is triggered simultaneously.

It should be noted that in this embodiment of this application, the foregoing solution of "in case that the target information is carried on the first DCI, the first DCI is allowed to be configured to indicate the target uplink authorization, and in case that the first DCI is further configured to indicate the target uplink authorization, the target uplink authorization indicates that the UE is allowed to send the PUSCH to the network device before receiving the target signal from the network device" may be applied to other scenarios apart from activation of an SCell of the UE. For example, when an aperiodic TRS or another RS associated with no feedback is triggered in an active serving cell, if the UE is allowed to be scheduled to send the PUSCH before RS transmission, it may be determined through the network that UE has received a corresponding RS trigger.

The target information is used to indicate a target signal, and the target signal is N RSs or RSs in N RS sets. Each RS set includes at least one RS, and N is a positive integer.

The target signal is used to activate the SCell of the UE, that is, each RS of the N RSs may be used to activate the SCell of the UE, or each RS of the N RS sets may be used to activate the SCell of the UE.

In some embodiments, in this embodiment of this application, the RS may be a TRS for time-frequency synchronization, a channel state information reference signal (CSI-RS) for beam measurement, a CSI-RS for obtaining channel state information, or a RS (a synchronization signal, PBCH block, or SSB (Synchronization Signal and PBCH block)) for acquiring timing, or another RS, which is not limited in this embodiment of this application.

Step 202: The UE receives the target information from the network device.

In some embodiments, in case that the UE receives a plurality of pieces of second information, if a time domain position of an RS indicated by each piece of second information in the plurality of pieces of second information completely overlaps each other, the target information is any of the plurality of pieces of second information; or if a time domain position of an RS indicated by each piece of second information partially overlaps each other, the target information is the last received second information among the plurality of pieces of second information; or if a time domain position of an RS indicated by each piece of second information does not overlap each other at all, the target information is at least one of the plurality of pieces of second information.

It can be understood that in this embodiment of this application, before the UE receives the target signal from the network device according to the target information, the UE may receive a plurality of pieces of second information from the network device, and the RS indicated by each piece of second information may be used to activate the SCell. Then, the UE may first determine whether the time domain position of the RS indicated by each piece of second information overlaps. If it is determined that the time domain position of the RS indicated by each piece of second information completely overlaps each other, any of the plurality of pieces of second information may be determined through the UE as the target information, and the target signal is received from the network device according to the target information. If it is determined that the time domain position of the RS indicated by each piece of second information partially overlaps each other (that is, there is overlap, for example, RSs overlap in one slot of two slots), the last received second information among the plurality of pieces of second information may be determined through the UE as the target information, and the target signal is received from the network device according to the target information. If it is determined that the time domain position of the RS indicated by each piece of second information does not overlap each other at all, at least one piece of second information among the plurality of pieces of second information may be determined through the UE as the target information, and the target signal is received from the network device according to the target information.

Step 203: The network device sends the target signal to the UE according to the target information.

Step 204: The UE receives the target signal from the network device according to the target information.

In some embodiments, the number of transmission times of the target signal is greater than or equal to 1. That is, in this embodiment of this application, the number of sending times of the target signal is not limited.

In this embodiment of this application, at least one RS may be configured for the UE by the network device in advance. For each RS of the at least one RS configured by the network device for the UE, the network device may send the RS to the UE once or several times, which is not limited in this embodiment of this application.

In this embodiment of this application, for each RS of the at least one RS configured by the network device for the UE, if the network device sends the RS to the UE several times, the RS may take effect within a time domain interval or take effect permanently after the network device sends each RS to the UE, which is not limited in this embodiment of this application.

In this embodiment of this application, for each RS of the at least one RS configured by the network device for the UE, if the network device sends the RS to the UE once, the number of CSI-RS resources included in one sending process is not limited, for example, the one sending process includes at most four CSI-RS resources.

In this embodiment of this application, for each RS of the at least one RS configured by the network device for the UE, if the network device sends the RS to the UE several times, the number of CSI-RS resources included in each of several sending processes is not limited, for example, each sending process includes at most four CSI-RS resources.

In some embodiments, the target signal is at least one of a plurality of RSs configured by the network device for the UE in advance through first RRC, which may be specifically determined according to use requirements and is not limited in this embodiment of this application.

In this embodiment of this application, the time domain position (for example, slot) in which the RS is transmitted may be configured. The time domain position in which the RS is transmitted may be a relative time domain position (for example, a relative slot position), and the relative time domain position (for example, the relative slot position) represents a time domain offset relative to a reference time domain position. The reference time domain position may be a first time domain position as follows, which will not be described herein. When there is a plurality of time domain offsets, at least one value greater than or equal to 5 ms is included in the plurality of time domain offsets. The time domain position in which the RS is transmitted may also be an absolute time domain position (for example, an absolute slot position). A plurality of possible time domain positions may be configured for each RS, and the plurality of possible time domain positions may or may not occur periodically, which is not limited in this embodiment of this application. For example, if the plurality of possible time domain positions may occur periodically, the minimum period may be 1 slot, which indicates that each slot has a corresponding RS.

Further, in some embodiments, in case that the number of transmission times of the target signal is greater than 1, a time domain position in which the RS is transmitted is determined by a predetermined time period and predetermined time domain offset. The predetermined time period may be indicated by radio resource control (RRC), MAC CE signaling, or DCI, or specified in a protocol; and the predetermined time domain offset may be indicated by the RRC, MAC CE signaling, or DCI, or specified in a protocol, which are specifically determined according to actual use requirements, and are not limited in this embodiment of this application.

It should be noted that, in this embodiment of this application, granularity for measuring the time domain position may be a slot (which may be 1 slot, 2 slots, or more slots), a symbol (which may be 1 symbol, 2 symbols, or more symbols), a millisecond (ms) (which may be 1 ms, 2 ms, or more ms), or a second (s) (which may be 1 second, 2 seconds, or more seconds), or another feasible granularity, which may be determined according to actual use requirements and is not limited in this embodiment of this application.

Exemplarily, both the predetermined time period and the predetermined time domain offset are indicated by the RRC. If the RRC indicates that the predetermined time period is 10 slots, and the predetermined time domain offset is 2 slots, and a time domain position in which the RS is transmitted is 2 slots, 12 slots, 22 slots, 32 slots . . . or (10M+2) slots . . . M is 0, 1, 2, 3, or 4 . . . .

In this embodiment of this application, the network device sends a plurality of RSs to the UE, and each RS is sent several times, so that the UE can receive the RSs, and then the SCell may be activated according to the RSs.

In some embodiments, the network device may further send the target signal to the UE in a target time domain position or target time domain interval according to the target information.

Exemplarily, step 203 may be specifically implemented by the following step 203*a*.

Step 203*a*: The network device sends the target signal to the UE in a target time domain position or target time domain interval according to the target information.

In some embodiments, the UE may further receive the target signal from the network device in the target time domain position or target time domain interval according to the target information.

Exemplarily, step 204 may be specifically implemented by the following step 204*a*.

Step 204*a*: The UE receives the target signal from the network device in the target time domain position or target time domain interval according to the target information.

In one case, the UE receives the target signal from the network device in the target time domain position according to the target information.

In some embodiments, the target time domain position is determined by a first time domain offset. The first time domain offset is a time domain offset between the first time domain position and the target time domain position.

In some embodiments, in case that the target information is carried on the first MAC CE signaling, the first time domain position includes any of the following: a time domain position in which DCI is used to schedule a first PDSCH carrying first MAC CE signaling, a time domain position in which the first PDSCH is sent, a time domain position in which the UE sends first acknowledgement (ACK) for the first PDSCH, a sum of the time domain position in which the UE sends the first ACK and first preset time duration (e.g., a fixed time period), or a time domain position in which the first MAC CE signaling takes effect. Alternatively, in case that the target information is carried on the first DCI, the first time domain position includes a time domain position in which the first DCI is scheduled. The first preset time duration may be specified in a protocol or configured by the network device, which is not limited in this embodiment of this application. Exemplarily, the first preset time duration may be 3 ms or 5 ms.

Exemplarily, in case that the target information is carried on the first MAC CE signaling, the first time domain position may be a slot in which DCI is used to schedule a PDSCH carrying first MAC CE signaling, a slot in which the PDSCH carrying the first MAC CE signaling is sent, a slot in which the UE sends the ACK for the PDSCH carrying the first MAC CE signaling, a sum of the slot in which the UE sends the ACK for the PDSCH carrying the first MAC CE signaling and the first preset time duration, or a slot in which the first MAC CE signaling takes effect. Alternatively, in case that the target information is carried on the first DCI, the first time domain position includes a slot in which the first DCI is scheduled.

In some embodiments, the target time domain position includes a time domain position in which each RS is transmitted, or a time domain position in which a first RS in the target signal is transmitted, which may be specifically determined according to actual use requirements and is not limited in this embodiment of this application.

In another case, the UE receives the target signal from the network device in a target time domain interval according to the target information.

In some embodiments, the target time domain interval is determined by at least two of the following: a start time domain position of the target time domain interval, an end time domain position of the target time domain interval, and duration of the target time domain interval. That is, the target time domain interval is determined by two or three of the start time domain position, the end time domain position, and the duration of the target time domain interval. The RS is sent at least once within the target time domain interval.

In some embodiments, the start time domain position is determined by any of the following: a second time domain offset and a second time domain position. The second time domain offset is a time domain offset between the start time domain position and the first time domain position.

In some embodiments, the second time domain position is determined by a fourth time domain position as follows. In case that the target information is carried on the first MAC CE signaling, the fourth time domain position includes any of the following: a time domain position in which DCI is used to schedule a first PDSCH carrying first MAC CE signaling, a time domain position in which the first PDSCH is sent, a time domain position in which the UE sends first ACK for the first PDSCH, a sum of the time domain position in which the UE sends the first ACK and second preset time duration, a time domain position in which the first MAC CE signaling takes effect, or a time domain position in which the RS is sent for the first time. Alternatively, in case that the target information is carried on the first DCI, the fourth time domain position includes: a time domain position in which the first DCI is scheduled; or the fourth time domain position is a time domain position in which radio frequency retuning is completed for a SCell. The second time domain position may be specified in a protocol or configured by the network device, which is not limited in this embodiment of this application. Exemplarily, the second preset time duration may be 3 ms or 5 ms. The second preset time duration may be the same as or different from the first preset time duration, which is not limited in this embodiment of this application.

In some embodiments, the second time domain position is the fourth time domain position; or the second time domain position is determined by the fourth time domain position and a fourth time domain offset; or the second time domain position is a first predetermined time domain position after the fourth time domain position. The first predetermined time domain position or the fourth time domain offset is indicated by the RRC, MAC CE signaling, or DCI, or specified in a protocol.

In some embodiments, in case that the target information is carried on first MAC CE signaling, the fourth time domain position includes at least one of the following: a slot in which DCI is used to schedule a PDSCH carrying the first MAC CE signaling, a slot in which the PDSCH carrying the first MAC CE signaling is sent, a slot in which the UE sends ACK for the PDSCH carrying the first MAC CE signaling, a sum of the slot in which the UE sends the ACK for the PDSCH carrying the first MAC CE signaling and second preset time duration, a slot in which the first MAC CE signaling takes effect, or a slot in which a RS is sent for the first time. Alternatively, in case that the target information is carried on the first DCI, the fourth time domain position includes a slot in which the first DCI is scheduled. Alternatively, the fourth time domain position is a slot in which radio frequency retuning is completed for a SCell.

In some embodiments, the end time domain position is determined by any of the following: a third time domain offset and a third time domain position. The third time domain offset is a time domain offset between the end time domain position and the first time domain position.

In some embodiments, the third time domain position is determined by a fifth time domain position. The fifth time domain position includes any of the following: a time domain position in which the network device sends first PDSCH on the SCell, a time domain position in which the network device sends signaling for scheduling a CSI report of the SCell, a time domain position in which the UE sends the CSI report, or a time domain position indicated in first information received by the UE, where the first information is used to indicate completion of RS sending. The fifth time domain position may also be a time domain position in which the UE completes SCell activation, and the fifth time domain position may also be a time domain position in which at least one RS has been sent.

In some embodiments, the third time domain position is the fifth time domain position; or the third time domain position is determined by the fifth time domain position and a fifth time domain offset; or the third time domain position is a second predetermined time domain position after the fifth time domain position, where the second predetermined time domain position or the fifth time domain offset is indicated by the RRC, MAC CE signaling, or DCI, or specified in a protocol.

Exemplarily, the fifth time domain position includes any of the following: a slot in which the network device sends a first PDSCH on the SCell, a slot in which the network device sends signaling for scheduling a CSI report of the SCell, a slot in which the UE sends the CSI report, or a slot indicated in the RRC, MAC CE signaling, or DCI received by the UE and used to indicate completion of RS sending.

In some embodiments, duration of the target time domain interval includes any of the following: time duration required for sending the target signal (that is, time duration required for sending the N RSs or RSs in the N RS sets), first preset time duration (e.g. preset fixed duration), and time duration required for time-frequency tracking, beam measurement, CSI reporting, or timing acquisition for the SCell specified in a protocol. The first preset time duration may be specified in a protocol or configured by the network device, which is not limited in this embodiment of this application. The duration of the target time domain interval is greater than time duration required for sending a RS at least once.

Exemplarily, the time duration required for completing the time-frequency tracking, beam measurement, CSI reporting, or timing acquisition for the SCell specified in the foregoing protocol may be the longest time duration required for completing the time-frequency tracking, beam measurement, CSI reporting, or timing acquisition for the SCell in the protocol, which is not limited in this embodiment of this application.

Exemplarily, if the RS is a TRS used for time-frequency tracking, the duration of the target time domain interval may be time duration required for completing the time-frequency tracking for the SCell specified in the protocol. If the RS is a CSI-RS used for beam measurement, the duration of the target time domain interval may be time duration required for completing beam measurement for the SCell specified in the protocol. If the RS is a CSI-RS used for CSI reporting, the duration of the target time domain interval may be time duration required for completing CSI reporting for the SCell specified in the protocol. If the RS is a RS (or SSB) used for timing acquisition, the duration of the target time domain interval may be time duration required for completing timing acquisition for the SCell specified in the protocol.

In some embodiments, the start time domain position is indicated by the RRC, MAC CE signaling, or DCI, or specified in the protocol. That is, the start time domain position of the target time domain interval is a first absolute time domain position (determined by the foregoing second time domain position) or a first relative time domain position (that is, a second time domain offset relative to a reference time domain position, for example, the reference time domain position may be the foregoing first time domain position) indicated by the RRC, MAC CE, or DCI.

In some embodiments, the end time domain position is indicated by the RRC, MAC CE signaling, or DCI, or specified in the protocol. That is, the end time domain position of the target time domain interval is a second absolute time domain position (determined by the foregoing third time domain position) or a second relative time domain position (that is, a third time domain offset relative to a reference time domain position, for example, the reference time domain position may be the foregoing first time domain position) indicated by the RRC, MAC CE signaling, or DCI.

In some embodiments, the duration of the target time domain interval is indicated by the RRC, MAC CE signaling, or DCI, or specified in the protocol.

In some embodiments, in case that a time-frequency resource of data information sent by the network device to the UE overlaps a time-frequency resource of one or more RSs sent by the network device to the UE, the network device and the UE may perform rate matching on transmission of the data information.

Exemplarily, step 203 (or 203*a*) may be specifically implemented by the following step 203*b*.

Step 203*b*: In case that time-frequency resources of data information sent by the network device to the UE overlap a time-frequency resource of one or more RSs sent by the network device to the UE, the network device may perform rate matching on transmission of the data information.

It should be noted that a traditional rate matching process may be referenced for the foregoing rate matching process, which is not described herein.

Exemplarily, step 204 (or 204*a*) may be specifically implemented by the following step 204*b*.

Step 204*b*: In case that the time-frequency resource of the data information received by the UE from the network device overlap the time-frequency resource of the one or more RSs received by the UE from the network device, the UE performs rate matching on the transmission of the data information.

In this embodiment of this application, in case that the time-frequency resource of the data information sent by the network device to the UE overlap the time-frequency resource of the one or more RSs sent by the network device to the UE, the network device and the UE may perform rate matching on the transmission of the data information, which can ensure normal transmission of the RSs, thus helping the UE receive the RSs and activate the SCell according to the RSs.

This embodiment of this application provides a method for transmitting a reference signal: UE receives target information from a network device, and receives a target signal from the network device according to the target information, where the target information is used to indicate the target signal, and the target signal is N RSs or RSs in N RS sets and is used to activate a SCell of the UE; and the target information is carried on first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that this solution can shorten activation time in the case of a long period for sending the RSs, and reduce signaling overhead in the case of a short period for sending the RSs.

Figure 3:
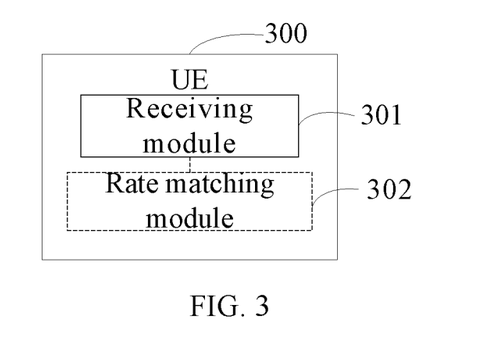
FIG. 3 is a schematic structural diagram of UE according to an embodiment of this application.

As shown in FIG. 3, an embodiment of this application provides UE 300, where the UE 300 includes a receiving module 301. The receiving module 301 is configured to receive target information from a network device, where the target information is used to indicate a target signal. The target signal is N RSs or RSs in N RS sets and is used to activate a SCell of the UE. The receiving module is further configured to receive the target signal from the network device according to the target information. The target information is carried on first MAC CE signaling or first DCI, and N is a positive integer.

In some embodiments, in case that the target information is carried on the first MAC CE signaling, the first MAC CE signaling is used to activate the SCell.

In some embodiments, in case that the target information is carried on the first DCI, the first DCI is used to schedule a PDSCH carrying second MAC CE signaling, and the second MAC CE signaling is used to activate the SCell.

In some embodiments, in case that the target information is carried on the first DCI, the first DCI is further configured to indicate target uplink authorization. The target uplink authorization indicates that the UE is allowed to send the PUSCH to the network device before receiving the target signal from the network device.

In some embodiments, the PUSCH is configured to indicate that the UE successfully receives the DCI.

In some embodiments, the number of transmission times of the target signal is greater than or equal to 1.

In some embodiments, in case that the number of transmission times of the target signal is greater than 1, a time domain position in which the RS is transmitted is determined by a predetermined time period and a predetermined time domain offset.

In some embodiments, the receiving module 301 is specifically configured to receive the target signal from the network device in a target time domain position or a target time domain interval according to the target information.

In some embodiments, the target time domain position is determined by a first time domain offset. The first time domain offset is a time domain offset between a first time domain position and the target time domain position.

In some embodiments, the target time domain position includes a time domain position in which each RS is transmitted, or a time domain position in which a first RS in the target signal is transmitted.

In some embodiments, the target time domain interval is determined by at least two of the following: a start time domain position of the target time domain interval, an end time domain position of the target time domain interval, and duration of the target time domain interval.

In some embodiments, the start time domain position is determined by any of the following: a second time domain offset and a second time domain position; and/or the end time domain position is determine by any of the following: a third time domain offset and a third time domain position; and/or the duration of the target time domain interval includes any of the following: time duration required for sending the target signal, first preset time duration, and time duration required for completing time-frequency tracking, beam measurement, CSI reporting, or timing acquisition for the SCell specified in a protocol. The second time domain offset is a time domain offset between the start time domain position and the first time domain position. The third time domain offset is a time domain offset between the end time domain position and the first time domain position.

In some embodiments, the second time domain position is determined by a fourth time domain position as follows. In case that the target information is carried on the first MAC CE signaling, the fourth time domain position includes any of the following: a time domain position in which DCI is used to schedule a first PDSCH carrying first MAC CE signaling, a time domain position in which the first PDSCH is sent, a time domain position in which the UE sends first ACK for the first PDSCH, a sum of the time domain position in which the UE sends the first ACK and second preset time duration, a time domain position in which the first MAC CE signaling takes effect, or a time domain position in which the RS is sent for the first time. Alternatively, in case that the target information is carried on the first DCI, the fourth time domain position includes: a time domain position in which the first DCI is scheduled; or the fourth time domain position is a time domain position in which radio frequency retuning is completed for the SCell.

In some embodiments, the second time domain position is determined by the fourth time domain position and a fourth time domain offset; or the second time domain position is a first predetermined time domain position after the fourth time domain position. The first predetermined time domain position or the fourth time domain offset is indicated by the RRC, MAC CE signaling, or DCI, or specified in a protocol.

In some embodiments, the third time domain position is determined by a fifth time domain position. The fifth time domain position includes any of the following: a time domain position in which the network device sends first PDSCH on the SCell, a time domain position in which the network device sends signaling for scheduling a CSI report of the SCell, a time domain position in which the UE sends the CSI report, or a time domain position indicated in first information received by the UE, where the first information is used to indicate completion of RS sending.

In some embodiments, the third time domain position is determined by the fifth time domain position and a fifth time domain offset; or the third time domain position is a second predetermined time domain position after the fifth time domain position, where the second predetermined time domain position or the fifth time domain offset is indicated by the RRC, MAC CE signaling, or DCI, or specified in a protocol.

In some embodiments, in case that the target information is carried on the first MAC CE signaling, the first time domain position includes any of the following: a time domain position in which DCI is used to schedule a first PDSCH carrying the first MAC CE signaling, a time domain position in which the first PDSCH is sent, a time domain position in which the UE sends first ACK for the first PDSCH, a sum of the time domain position in which the UE sends the first ACK and first preset time duration, or a time domain position in which the first MAC CE signaling takes effect. Alternatively, in case that the target information is carried on the first DCI, the first time domain position includes a time domain position in which the first DCI is scheduled.

In some embodiments, the start time domain position is indicated by the RRC, MAC CE signaling, or DCI, or specified in the protocol; and/or, the end time domain position is indicated by the RRC, MAC CE signaling, or DCI, or specified in the protocol; and/or the duration of the target time domain interval is indicated by the RRC, MAC CE signaling, or DCI, or specified in the protocol.

In some embodiments, the target signal is at least one of a plurality of RSs configured for the UE in advance by the network device through first radio resource control RRC. Exemplarily, the network explicitly or implicitly indicates one or more of the TRSs configured in advance.

In some embodiments, in case that the UE receives a plurality of pieces of second information, if a time domain position of a RS indicated by each piece of second information in the plurality of pieces of second information completely overlaps each other, the target information is any of the plurality of pieces of second information; or if a time domain position of a RS indicated by each piece of second information partially overlaps each other, the target information is the last received second information among the plurality of pieces of second information; or if a time domain position of a RS indicated by each piece of second information does not overlap each other at all, the target information is at least one of the plurality of pieces of second information.

In some embodiments, the UE 300 further includes a rate matching module 302, where the rate matching module 302 is configured to perform rate matching on transmission of data information when a time-frequency resource of the data information received by the UE from the network device overlaps a time-frequency resource of one or more RSs received by the UE from the network device.

It should be noted that, as shown in FIG. 3, a module required to be included in the UE 300 is indicated by a solid line box, such as the receiving module 301; and a module that may or may not be included in the UE 300 is indicated by a dashed box, such as the rate matching module 302.

The UE provided in this embodiment of this application can implement the processes in the foregoing embodiments. To avoid repetition, details are not described herein again.

For the UE provided in this embodiment of this application, the UE receives target information from a network device, and receives a target signal from the network device according to the target information, where the target information is used to indicate the target signal, and the target signal is N RSs or RSs in N RS sets and is used to activate a SCell of the UE; and the target information is carried on first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that this solution can shorten activation time in the case of a long period for sending the RSs, and reduce signaling overhead in the case of a short period for sending the RSs.

Figure 4:
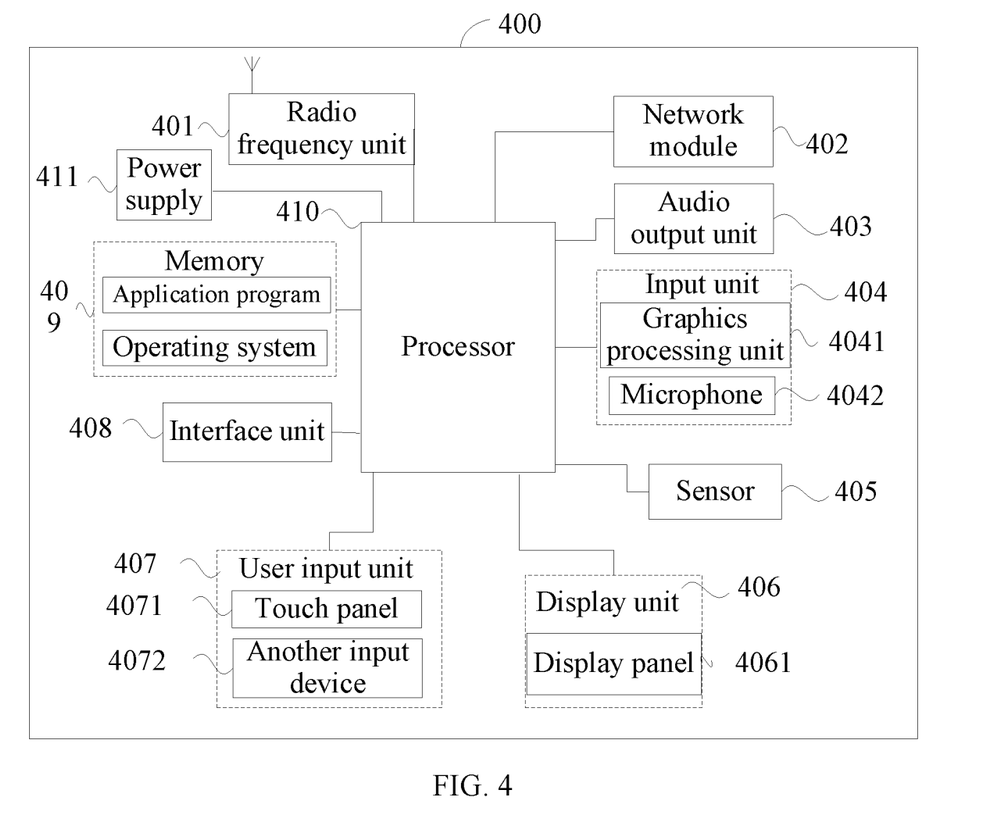
FIG. 4 is a schematic diagram of hardware of UE according to an embodiment of this application.

FIG. 4 is a schematic structural diagram of hardware of UE according to an embodiment of this application. The UE 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and the like. A person skilled in the art may understand that a structure of the UE 400 shown in FIG. 4 does not constitute a limitation on the UE, and the UE 400 may include more or fewer components than those shown in the figure, or combine some components, or have different component arrangements. In this embodiment of this application, the UE 400 includes, but is not limited to, a mobile phone, a tablet computer, a notebook computer, a palmtop computer, vehicle-mounted UE, a wearable device, a pedometer, or the like.

The radio frequency unit 401 is configured to receive target information from a network device, where the target information is used to indicate a target signal, and the target signal is N RSs or RSs in N RS sets and is used to activate a SCell of the UE; and the radio frequency unit is further configured to receive the target signal from the network device according to the target information, where the target information is carried on first MAC CE signaling or first DCI, and N is a positive integer.

For the UE provided in this embodiment of this application, the UE receives target information from the network device, and receives the target signal from the network device according to the target information, where the target information is used to indicate the target signal, and the target signal is N RSs or RSs in N RS sets and is used to activate the SCell of the UE; and the target information is carried on the first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that, through this solution, activation time can be shortened compared with the case in a long period for sending the RSs, and signaling overhead can be reduced compared with the case in a short period for sending the RSs.

It should be understood that, in this embodiment of this application, the radio frequency unit 401 may be configured to receive and send information, or receive and send signals during a call. Specifically, the radio frequency unit receives downlink data from a base station, sends the downlink data to the processor 410 for processing, and sends uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 may further communicate with a network and other devices by using a wireless communication system.

The UE 400 provides the user with wireless broadband Internet access by using the network module 402, for example, helps the user send or receive an email, browse a web page, and access streaming media.

The audio output unit 403 may convert audio data received by the radio frequency unit 401 or the network module 402 or stored in the memory 409 into an audio signal, and output the audio signal as sound. In addition, the audio output unit 403 may also provide audio output (for example, call signal receiving sound or message receiving sound) related to a specific function performed by the UE 400. The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 processes image data of a static picture or a video obtained by an image capture apparatus (for example, a camera) in video capture mode or image capture mode. A processed image frame may be displayed on the display unit 406. An image frame processed by the graphics processing unit 4041 may be stored in the memory 409 (or another storage medium) or sent via the radio frequency unit 401 or the network module 402. The microphone 4042 may receive a sound and can process such sound into audio data. Processed audio data may be converted, in a call mode, into a format that can be sent to a mobile communication base station by using the radio frequency unit 401 for output.

The UE 400 further includes at least one sensor 405, for example, a light sensor, a motion sensor, and another sensor. Specifically, the light sensor includes an ambient light sensor and a proximity sensor, where the ambient light sensor may adjust brightness of a display panel 4061 based on brightness of ambient light, and the proximity sensor may turn off the display panel 4061 and/or backlight when the UE 400 is moved towards the ear. As a motion sensor, an accelerometer sensor may detect magnitude of acceleration in various directions (usually three axes), may detect magnitude and a direction of gravity when stationary, may be configured to identify UE postures (such as horizontal and vertical screen switch, related games, and magnetometer posture calibration), may perform functions related to vibration identification (such as a pedometer and a knock), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein.

The display unit 406 is configured to display information inputted by a user or information provided to a user. The display unit 406 may include a display panel 4061, and the display panel 4061 may be configured in a form of liquid crystal display (LCD), organic light-emitting diode (OLED), or the like.

The user input unit 407 may be configured to receive input digit or character information, and generate a key signal input related to user setting and function control of the UE 400. Specifically, the user input unit 407 includes a touch panel 4071 and another input device 4072. The touch panel 4071 is also referred to as a touchscreen, and may collect a touch operation performed by a user on or near the touch panel 4071 (such as an operation performed by a user on or near the touch panel 4071 by using any proper object or accessory, such as a finger or a stylus). The touch panel 4071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 410, and receives and executes a command from the processor 410. In addition, the touch panel 4071 may be implemented in a plurality of forms, such as a resistive type, a capacitive type, an infrared ray type, or a surface acoustic wave type. The user input unit 407 may further include another input device 4072 in addition to the touch panel 4071. Specifically, the another input device 4072 may include but is not limited to a physical keyboard, a function button (such as a volume control button or a power on/off button), a trackball, a mouse, a joystick, or the like. Details are not described herein.

Further, the touch panel 4071 may cover the display panel 4061. When detecting a touch operation on or near the touch panel 4071, the touch panel transmits the touch operation to the processor 410 to determine a type of a touch event. Then the processor 410 provides corresponding visual output on the display panel 4061 based on the type of the touch event. Although in FIG. 4, the touch panel 4071 and the display panel 4061 act as two separate parts to implement input and output functions of the UE 400, in some embodiments, the touch panel 4071 and the display panel 4061 may be integrated to implement the input and output functions of the UE 400. This is not specifically limited herein.

The interface unit 408 is an interface for connecting an external apparatus to the UE 400. For example, the external apparatus may include a wired or wireless headset port, an external power supply (or a battery charger) port, a wired or wireless data port, a storage card port, a port for connecting an apparatus having an identification module, an audio input/output (I/O) port, a video I/O port, a headset port, or the like. The interface unit 408 may be configured to receive input (for example, data information and power) from an external apparatus and transmit the received input to one or more elements in the UE 400 or may be configured to transmit data between the UE 400 and the external apparatus.

The memory 409 may be configured to store software programs and various types of data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 409 may include a high-speed random access memory, and may further include a non-volatile memory, for example, at least one magnetic disk storage device, a flash memory device, or another volatile solid-state storage device.

The processor 410 is a control center of the UE 400, and connects all parts of the entire UE 400 by using various interfaces and lines. By running or executing a software program and/or a module stored in the memory 409 and invoking data stored in the memory 409, the processor performs various functions and/or data processing of the UE 400, to perform overall monitoring on the UE 400. The processor 410 may include one or more processing units. In some embodiments, an application processor and a modem processor may be integrated into the processor 410. The application processor mainly processes an operating system, a user interface, an application program, and the like. The modem processor mainly processes wireless communication. It can be understood that the foregoing modem processor may not be integrated in the processor 410.

The UE 400 may further include the power supply 411 (for example, a battery) supplying power to each component. In some embodiments, the power supply 411 may be logically connected to the processor 410 by using a power management system, so that functions such as charge and discharge management and power consumption management are implemented by using the power management system.

In addition, the UE 400 includes some function modules not shown. Details are not described herein.

In some embodiments, this application further provides UE, including the processor 410 and the memory 409 that are shown in FIG. 4, and a computer program that is stored in the memory 409 and that can be run on the processor 410, where when the computer program is executed by the processor 410, the processes of the foregoing method embodiments are implemented, and the same technical effects can be achieved. To avoid repetition, details are not described herein again.

Figure 5:
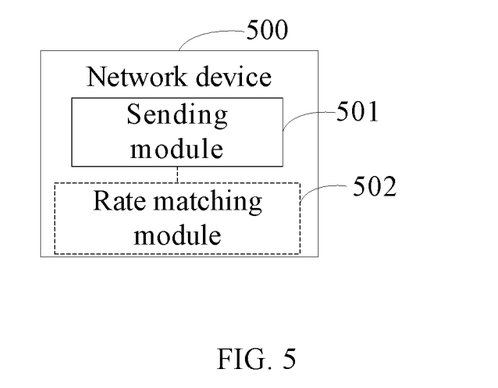
FIG. 5 is a schematic structural diagram of a network device according to an embodiment of this application.

FIG. 5 is a schematic structural diagram of hardware of a network device according to an embodiment of this application. The network device 500 includes a sending module 501. The sending module 501 is configured to send target information to user equipment UE, where the target information is used to indicate a target signal. The target signal is N RSs or RSs in N RS sets and is used to activate a SCell of the UE. The sending module is further configured to send the target signal to the UE according to the target information. The target information is carried on first MAC CE signaling or first DCI, and N is a positive integer.

In some embodiments, in case that the target information is carried on the first MAC CE signaling, the first MAC CE signaling is used to activate the SCell.

In some embodiments, in case that the target information is carried on the first DCI, the first DCI is used to schedule a PDSCH carrying second MAC CE signaling, and the second MAC CE signaling is used to activate the SCell.

In some embodiments, in case that the target information is carried on the first DCI, the first DCI is further configured to indicate target uplink authorization. The target uplink authorization indicates that the UE is allowed to send the PUSCH to the network device before receiving the target signal from the network device.

In some embodiments, the PUSCH is configured to indicate that the UE successfully receives the DCI.

In some embodiments, the number of transmission times of the target signal is greater than or equal to 1.

In some embodiments, in case that the number of transmission times of the target signal is greater than 1, a time domain position in which the RS is transmitted is determined by a predetermined time period and a predetermined time domain offset.

In some embodiments, the sending module 501 is specifically configured to send the target signal to the UE in a target time domain position or target time domain interval according to the target information.

In some embodiments, the target time domain position is determined by a first time domain offset. The first time domain offset is a time domain offset between a first time domain position and the target time domain position.

In some embodiments, the target time domain position includes a time domain position in which each RS is transmitted, or a time domain position in which a first RS in the target signal is transmitted.

In some embodiments, the target time domain interval is determined by at least two of the following: a start time domain position of the target time domain interval, an end time domain position of the target time domain interval, and duration of the target time domain interval.

In some embodiments, the start time domain position is determined by any of the following: a second time domain offset and a second time domain position; and/or the end time domain position is determine by any of the following: a third time domain offset and a third time domain position; and/or the duration of the target time domain interval includes any of the following: time duration required for sending the target signal, first preset time duration, and time duration required for completing time-frequency tracking, beam measurement, CSI reporting, or timing acquisition for the SCell specified in a protocol. The second time domain offset is a time domain offset between the start time domain position and the first time domain position. The third time domain offset is a time domain offset between the end time domain position and the first time domain position.

In some embodiments, the second time domain position is determined by a fourth time domain position as follows. In case that the target information is carried on the first MAC CE signaling, the fourth time domain position includes any of the following: a time domain position in which DCI is used to schedule a first PDSCH carrying first MAC CE signaling, a time domain position in which the first PDSCH is sent, a time domain position in which the UE sends first ACK for the first PDSCH, a sum of the time domain position in which the UE sends the first ACK and second preset time duration, a time domain position in which the first MAC CE signaling takes effect, or a time domain position in which the RS is sent for the first time. Alternatively, in case that the target information is carried on the first DCI, the fourth time domain position includes: a time domain position in which the first DCI is scheduled; or the fourth time domain position is a time domain position in which radio frequency retuning is completed for the SCell.

In some embodiments, the second time domain position is determined by the fourth time domain position and a fourth time domain offset; or the second time domain position is a first predetermined time domain position after the fourth time domain position. The first predetermined time domain position or the fourth time domain offset is indicated by the RRC, MAC CE signaling, or DCI, or specified in a protocol.

In some embodiments, the third time domain position is determined by a fifth time domain position. The fifth time domain position includes any of the following: a time domain position in which the network device sends first PDSCH on the SCell, a time domain position in which the network device sends signaling for scheduling a CSI report of the SCell, a time domain position in which the UE sends the CSI report, or a time domain position indicated in first information received by the UE, where the first information is used to indicate completion of RS sending.

In some embodiments, the third time domain position is determined by the fifth time domain position and a fifth time domain offset; or the third time domain position is a second predetermined time domain position after the fifth time domain position, where the second predetermined time domain position or the fifth time domain offset is indicated by the RRC, MAC CE signaling, or DCI, or specified in a protocol.

In some embodiments, in case that the target information is carried on the first MAC CE signaling, the first time domain position includes any of the following: a time domain position in which DCI is used to schedule a first PDSCH carrying the first MAC CE signaling, a time domain position in which the first PDSCH is sent, a time domain position in which the UE sends first ACK for the first PDSCH, a sum of the time domain position in which the UE sends the first ACK and first preset time duration, or a time domain position in which the first MAC CE signaling takes effect. Alternatively, in case that the target information is carried on the first DCI, the first time domain position includes a time domain position in which the first DCI is scheduled.

In some embodiments, the start time domain position is indicated by the RRC, MAC CE signaling, or DCI, or specified in the protocol; and/or, the end time domain position is indicated by the RRC, MAC CE signaling, or DCI, or specified in the protocol; and/or the duration of the target time domain interval is indicated by the RRC, MAC CE signaling, or DCI, or specified in the protocol.

In some embodiments, the target signal is at least one of a plurality of RSs configured for the UE in advance by the network device through first radio resource control RRC.

In some embodiments, the network device 500 further includes a rate matching module 502. The rate matching module 502 is configured to perform rate matching on transmission of data information when a time-frequency resource of the data information sent by the network device to the UE overlaps a time-frequency resource of one or more RSs sent by the network device to the UE.

It should be noted that, as shown in FIG. 5, a module required to be included in the network device 500 is indicated by a solid line box, such as the sending module 501; and a module that may or may not be included in the network device 500 is indicated by a dashed box, such as the rate matching module 502.

The network device provided in this embodiment of this application may be the foregoing network device, which can implement the processes in the foregoing method embodiments. To avoid repetition, details are not described herein again.

For the network device provided in this embodiment of this application, the network device sends the target information to the UE, and sends the target signal to the UE according to the target information, where the target information is used to indicate the target signal, and the target signal is N RSs or RSs in N RS sets and is used to activate a SCell of the UE; and the target information is carried on the first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that, through this solution, activation time can be shortened compared with the case in a long period for sending the RSs, and signaling overhead can be reduced compared with the case in a short period for sending the RSs.

Figure 6:
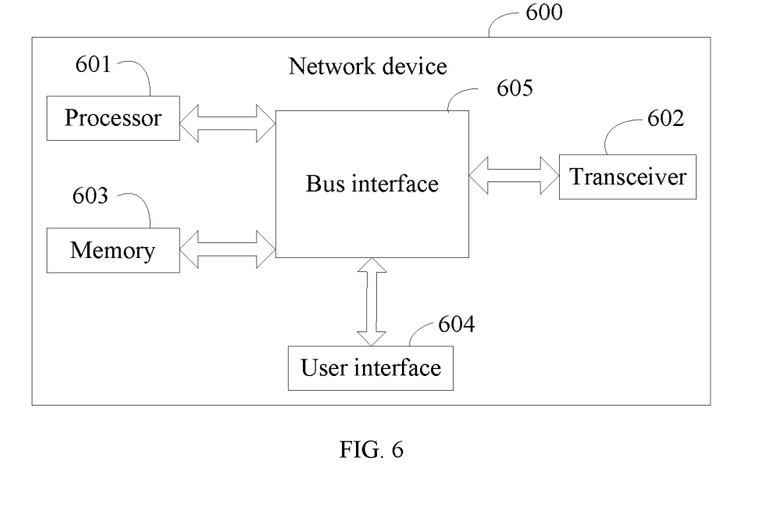
FIG. 6 is a schematic diagram of hardware of a network device according to an embodiment of this application.

FIG. 6 is a schematic structural diagram of hardware of a network device according to an embodiment of this application. The network device 600 includes a processor 601, a transceiver 602, a memory 603, a user interface 604, and a bus interface 605.

The transceiver 602 is configured to send target information to user equipment UE, where the target information is used to indicate a target signal. The target signal is N RSs or RSs in N RS sets, and the target signal is used to activate a SCell of the UE. The transceiver is further configured to send the target signal to the UE according to the target information. The target information is carried on first MAC CE signaling or first DCI, and N is a positive integer.

For the network device provided in this embodiment of this application, the network device sends the target information to the UE, and sends the target signal to the UE according to the target information, where the target information is used to indicate the target signal, and the target signal is N RSs or RSs in N RS sets and is used to activate a SCell of the UE; and the target information is carried on the first MAC CE signaling or first DCI, and N is a positive integer. Through this solution, the UE may receive the target signal (N RSs or RSs in N RS sets) from the network device according to the target information sent by the network device, and then activate the SCell according to the received target information. Therefore, during SCell activation, the network device does not need to periodically send the RSs to the UE in the prior art, so that, through this solution, activation time can be shortened compared with the case in a long period for sending the RSs, and signaling overhead can be reduced compared with the case in a short period for sending the RSs.

In this embodiment of this application, in FIG. 6, a bus architecture may include any quantity of interconnected buses and bridges, and is specifically linked by various circuits of one or more processors represented by the processor 601 and a memory represented by the memory 603. The bus architecture may further link various other circuits such as those of a peripheral device, a voltage regulator, and a power management circuit. These are well known in the art, and therefore are not further described in this specification. The bus interface provides an interface. The transceiver 602 may be a plurality of elements, that is, include a transmitter and a receiver, and provide a unit for communicating with various other apparatuses on a transmission medium. For different UE, the user interface 604 may be alternatively an interface for externally and internally connecting a required device. The connected device includes, but is not limited to a keypad, a display, a speaker, a microphone, a joystick, or the like. The processor 601 is responsible for managing the bus architecture and common processing, and the memory 603 may store data used when the processor 601 performs an operation.

In addition, the network device 600 further includes some function modules not shown, and details are not described herein.

In some embodiments, an embodiment of this application further provides a network device, including the processor 601 and the memory 603 that are shown in FIG. 6, and a computer program stored in the memory 603 and executable on the processor 601, where when the computer program is executed by the processor 601, the processes of the foregoing method embodiments are implemented, and the same technical effects can be achieved. To avoid repetition, details are not described herein again.

This embodiment of this application further provides a communications system, which includes the UE and network device described in the foregoing embodiment.

This embodiment of this application further provides a computer readable storage medium. The computer readable storage medium stores a computer program. When the computer program is executed by the processor 410 shown in FIG. 4 and/or the processor 601 shown in FIG. 6, processes of the foregoing method embodiments are implemented, and the same technical effects can be achieved. To avoid repetition, details are not described herein again. The computer readable storage medium is, for example, a read-only memory (ROM), a random access memory (RAM), a magnetic disk, or an optical disc.

It should be noted that, in this specification, the terms "comprise", "include", or any other variant thereof is intended to cover a non-exclusive inclusion, so that a process, a method, an article, or an apparatus that includes a list of elements not only includes those elements but also includes other elements which are not expressly listed, or further includes an element inherent to such process, method, article, or apparatus. Without more restrictions, an element defined by the statement "including a . . . " does not exclude another same element in a process, method, article, or apparatus that includes the element.

According to the foregoing descriptions of the implementations, a person skilled in the art may clearly understand that the foregoing method in the embodiment may be implemented by using software plus a required universal hardware platform, or certainly may be implemented by using hardware. However, in many cases, the former is a better implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection scope of this application.

The invention claimed is:

1. A method for transmitting a reference signal, performed by user equipment (UE), comprising:
receiving target information from a network device, wherein the target information is used to indicate a target signal, and the target signal is N reference signals (RSs) or RSs in N RS sets and is used to activate a secondary cell (SCell) of the UE; and receiving the target signal from the network device according to the target information, wherein the target information is carried on first media access control control element (MAC CE) signaling or first downlink control information (DCI), and N is a positive integer; and transmission times of the target signal are greater than 1, and a time domain position in which the RSs are transmitted is determined by a predetermined time period and a predetermined time domain offset.

2. The method according to claim 1, wherein when the target information is carried on the first MAC CE signaling, the first MAC CE signaling is used to activate the SCell; or when the target information is carried on the first DCI, the first DCI is used to schedule a physical downlink shared channel (PDSCH) carrying a second MAC CE signaling, and the second MAC CE signaling is used to activate the SCell; and the first DCI is further used to indicate target uplink authorization, wherein the target uplink authorization indicates that the UB is allowed to send a physical uplink shared channel (PUSCH) to the network device before receiving the target signal from the network device.

3. The method according to claim 2, wherein the PUSCH is configured to indicate that the UE successfully receives the DCI.

4. The method according to claim 1, wherein the receiving the target signal from the network device according to the target information comprises:

receiving the target signal from the network device in a target time domain position or target time domain interval according to the target information.

5. The method according to claim 4, wherein the target time domain position is determined by a first time domain offset, wherein the first time domain offset is a time domain offset between a first time domain position and the target time domain position.

6. The method according to claim 4, wherein the target time domain position comprises a time domain position in which each RS is transmitted, or a time domain position in which a first RS in the target signal is transmitted.

7. The method according to claim 4, wherein the target time domain interval is determined by at least two of the following:

a start time domain position of the target time domain interval, an end time domain position of the target time domain interval, and duration of the target time domain interval.

8. The method according to claim 7, wherein the start time domain position is determined by any one of the following: a second time domain offset and a second time domain position; or the end time domain position is determined by any one of the following: a third time domain offset and a third time domain position; or the duration of the target time domain interval comprises any one of the following: time duration required for transmitting the target signal, first preset time duration, and time duration required for completing, as specified in a protocol, time-frequency tracking, beam measurement, reporting of channel state information (CSI), or timing acquisition for the SCell, wherein the second time domain offset is a time domain offset between the start time domain position and a first time domain position; and the third time domain offset is a time domain offset between the end time domain position and the first time domain position.

9. The method according to claim 8, wherein the second time domain position is determined by a fourth time domain position:

when the target information is carried on the first MAC CE signaling, the fourth time domain position comprises any one of the following:

a time domain position in which DCI is used to schedule a first PDSCH carrying the first MAC CE signaling, a time domain position in which the first PDSCH is sent, a time domain position in which the UE sends first acknowledgement (ACK) for the first PDSCH, a sum of a time domain position in which the UE sends the first ACK and second preset time duration, a time domain position in which the first MAC CE signaling takes effect, or a time domain position in which a RS is sent for the first time, or when the target information is carried on the first DCI, the fourth time domain position comprises: a time domain position in which the first DCI is scheduled; or the fourth time domain position is a time domain position in which radio frequency correction for the SCell is completed.

10. The method according to claim 9, wherein the second time domain position is determined by the fourth time domain position and a fourth time domain offset; or the second time domain position is a first predetermined time domain position after the fourth time domain position, wherein the first predetermined time domain position or the fourth time domain offset is indicated by a radio resource control (RRC), MAC CB signaling, or DCI, or specified in a protocol.

11. The method according to claim 8, wherein the third time domain position is determined by a fifth time domain position, wherein the fifth time domain position comprises any one of the following: a time domain position in which the network device sends a first PDSCH on the SCell, a time domain position in which the network device sends signaling for scheduling a CSI report for the SCell, a time domain position in which the UE sends a CSI report, or a time domain position indicated in first information received by the UE, wherein the first information is used to indicate completion of RS sending.

12. The method according to claim 5, wherein when the target information is carried on the first MAC CE signaling, the first time domain position comprises any one of the following:

a time domain position in which DCI is used to schedule a first PDSCH carrying the first MAC CE signaling, a time domain position in which the first PDSCH is sent, a time domain position in which the UE sends first ACK for the first PDSCH, a time domain position corresponding to a first preset time domain length after the time domain position in which the UE sends the first ACK, or a time domain position in which the first MAC CE signaling takes effect, or when the target information is carried on the first DCI, the first time domain position comprises a time domain position in which the first DCI is scheduled.

13. The method according to claim 1, wherein the target signal is at least one of a plurality of RSs configured for the UE in advance by the network device through first radio resource control (RRC).

14. The method according to claim 1, wherein when the UE receives a plurality of pieces of second information,
when a time domain position of a RS indicated by each of the plurality of pieces of second information completely overlaps each other, the target information is any one of the plurality of pieces of second information;
when a time domain position of a RS indicated by each of the plurality of pieces of second information partially overlaps each other, the target information is last received second information among the plurality of pieces of second information; or
when a time domain position of a RS indicated by each of the plurality of pieces of second information does not overlap each other at all, the target information is at least one of the plurality of pieces of second information.

15. A method for transmitting a reference signal, performed by a network device, comprising:
sending target information to user equipment (UE), wherein the target information is used to indicate a target signal, and the target signal is N reference signals (RSs) or RSs in N RS sets and is used to activate a secondary cell (SCell) of the UE; and
sending the target signal to the UE according to the target information,
wherein the target information is carried on first media access control control element (MAC CE) signaling or first downlink control information (DCD), and N is a positive integer; and
transmission times of the target signal are greater than 1, and a time domain position in which the RSs are transmitted is determined by a predetermined time period and a predetermined time domain offset.

16. The method according to claim 15, wherein when the target information is carried on the first MAC CB signaling, the first MAC CE signaling is used to activate the SCell; or
when the target information is carried on the first DCI, the first DCI is used to schedule a physical downlink shared channel (PDSCH) carrying a second MAC CE signaling, and the second MAC CE signaling is used to activate the SCell; and
the first DCI is further used to indicate target uplink authorization,
wherein the target uplink authorization indicates that the UE is allowed to send a physical uplink shared channel (PUSCH) to the network device before receiving the target signal from the network device.

17. The method according to claim 15, wherein the sending the target signal to the UE according to the target information comprises:
sending the target signal to the UE in a target time domain position or target time domain interval according to the target information.

18. The method according to claim 17, wherein the target time domain position is determined by a first time domain offset, wherein the first time domain offset is a time domain offset between a first time domain position and the target time domain position.

19. User equipment UE, comprising: a processor, a memory, and a computer program that is stored in the memory and that can be run on the processor, wherein when the computer program is executed by the processor, the method for transmitting a reference signal according to claim 1 is implemented.

* * * * *